United States Patent [19]

Smith

[11] Patent Number: 5,567,529
[45] Date of Patent: Oct. 22, 1996

[54] MULTILAYERED GLASS LAMINATE HAVING ENHANCED RESISTANCE TO PENETRATION BY HIGH VELOCITY PROJECTILES

[75] Inventor: Charles A. Smith, Vienna, W. Va.

[73] Assignee: E. I. Du Pont de Nemours and Company, Wilmington, Del.

[21] Appl. No.: 244,191

[22] PCT Filed: Nov. 27, 1991

[86] PCT No.: PCT/US91/08751

§ 371 Date: Nov. 15, 1994

§ 102(e) Date: Nov. 15, 1994

[87] PCT Pub. No.: WO93/10973

PCT Pub. Date: Jun. 10, 1993

[51] Int. Cl.$^6$ .............................. B32B 17/10; B32B 27/08
[52] U.S. Cl. ...................... 428/425.6; 428/437; 428/483; 428/911
[58] Field of Search ............................... 428/425.6, 437, 428/483, 911

[56] References Cited

U.S. PATENT DOCUMENTS

| | | | |
|---|---|---|---|
| 4,072,779 | 2/1978 | Knox et al. | 428/220 |
| 4,242,403 | 12/1980 | Mattimoe et al. | 428/213 |
| 4,952,457 | 8/1990 | Cartier et al. | 428/425.6 |
| 4,956,227 | 9/1990 | Hirayama et al. | 428/331 |

FOREIGN PATENT DOCUMENTS 0373139  12/1989  European Pat. Off. .

Primary Examiner—Frederick Krass
Attorney, Agent, or Firm—Rodney B. Carroll

[57] ABSTRACT

A multilayered glass laminate having enhanced resistance to spalling and penetration by high velocity projectiles consists of at least three plies of glass (10, 12, 14) with layers of plasticized polyvinyl butyral (16, 18, 20) therebetween and having permanently bonded to an outer layer of one of said plies of glass (14) a thin composite consisting of an adhesive energy absorbing layer (22) and a dimensionally stable polyester film (24).

3 Claims, 1 Drawing Sheet

MULTILAYERED GLASS LAMINATE HAVING ENHANCED RESISTANCE TO PENETRATION BY HIGH VELOCITY PROJECTILES

BACKGROUND OF THE INVENTION

This invention relates to glass laminates having enhanced resistance to penetration by high velocity projectiles. More particularly, the invention relates to relatively thin glass laminates which not only stop glass from spalling when impacted by small and medium caliber bullets but also stops penetration of the laminates by the bullets or other small high velocity projectiles.

Various types of transparent laminated structures have been disclosed for protecting personnel from flying splinters and fragments of glazing materials which are released when a high velocity projectile strikes the structure. In U.S. Pat. No. 3,658,636 thick plates of an amorphous polyamide are formed into a sandwich structure with silicate glass. U.S. Pat. No. 2,861,021 describes a structure in which polymethyl methacrylate sheets are laminated with polyvinyl butyral and faced with a layer of a polyamide, polyester or regenerated cellulose sheet. Multiple plies of glass and polyvinyl butyral are used in combination with a plastic interlayer as an impact absorption section in the structure disclosed in U.S. Pat. No. 4,130,684.

The problem of spalling of an anti-abrasion layer which is applied to a laminate using polycarbonate sheets is addressed in U.S. Pat. No. 4,812,359 by applying a thin polycarbonate sheet having an abrasion-resistant self-healing coating. A similar laminate which includes an internal elastic expansion core with a thin polycarbonate sheet covered with an antiabrasive which can be replaced is disclosed in U.S. Pat. No. 4,879,183. British Patent 828,381 discloses a five layer laminate consisting of two layers of glass, two layers of polyvinyl butyrate and a central layer of polyethylene terephthalate. Published UK Application 2 156 736A discloses an impact resistant laminate comprising a number of glass sheets which are laminated together with a rear polycarbonate sheet which is said to be resistant to spalling.

A problem with most "bullet resistant" structures is that they have a thickness in excess of that which can be accommodated in usual glazing applications. Some structures are effective in controlling spalling but are not effective in stopping penetration of the laminate by a projectile. Most of the structures rely on incorporating layers of various materials in the laminated structure. This complicates manufacture and increases costs since different materials require different laminating techniques.

It has been found that by permanently bonding a very thin composite consisting of an adhesive layer and a dimensionally stable polyester film to multiple plies of glass with layers of plasticized polyvinyl butyral there between, a glass laminate of substantially reduced thickness is provided which is capable of resisting penetration of high velocity projectiles with little, if any, spalling from the inner rear face of the laminate.

SUMMARY OF THE INVENTION

This invention provides a laminated glazing to which is attached a permanent, energy absorbing thin plastic composite consisting of an adhesive energy absorbing layer, such as polyvinyl butyral, and a strong, dimensionally stable, chemical and abrasion resistant layer, such as a layer of polyester film which may be coated with a polysiloxane or other abrasion resistant coating. The thin plastic composite prevents spalling from the surface of the glazing to which it has been laminated. Surprisingly, in addition to stopping glass from spalling, the composite increases the integrity and penetration resistance of the constructions to which it is laminated when they are impacted by bullets or other projectiles striking the opposite surface. By retaining the surface glass and holding the construction together, and by other mechanisms not fully understood, penetration resistance is substantially enhanced far beyond what would be expected of such a thin composite structure.

In accordance with this invention a multilayered glass laminate consisting of at least three plies of glass is prepared by interposing layers of plasticized polyvinyl butyral between the plies of glass. The plies of glass each should have a thickness from about ⅛ to about ¼ inch (3.175 to 6.35 mm) and the polyvinyl butyral layer should have a thickness from about 15 to about 60 mils (0.381 to 1.524 mm). A thin composite consisting of an adhesive layer of polyvinyl butyral having a thickness from 15 to 60 mils (0.381 to 1.524 mm) and a polyester film having a thickness from about 3 to about 15 mils (0.0762 to 0.381 mm) is permanently bonded to an outer layer of the glass. The total thickness of the composite is not greater than about 2 mm; Anti-spalling and penetration resistant structures having an overall reduction in thickness of 20% or more as compared to known glass laminates used in bullet resistant glazing applications are provided by this invention. Preferably, three to seven plies of glass adhered together with adhesive layers of polyvinyl butyral are used. It is to be understood that the relative thickness and number of plies of glass of the structures of this invention will be determined by the "threat level", i.e. the size and velocity of projectiles which are expected to be encountered.

The polyvinyl butyral adhesive sheeting my be selected from the many commercially available grades of plasticized polyvinyl butyral. A particularly desirable product of the type disclosed in Moynihan, U.S. Pat. No. 4,292,372 is sold by E. I. Du Pont de Nemours and Company under the trademark Butacite®. Other known adhesive material for glass laminates such as polyurethane my also be used. The polyester film may be of the type disclosed in Knox, U.S. Pat. No. 4,072,779, and may be coated with an abrasion resistant material as disclosed in that patent. The glass may be selected in accordance with ASTM specifications, Desigrmdon C 1172-91. The glass may be tempered or annealed. Tempered glass is generally preferred.

DETAILED DESCRIPTION

Figure 1:
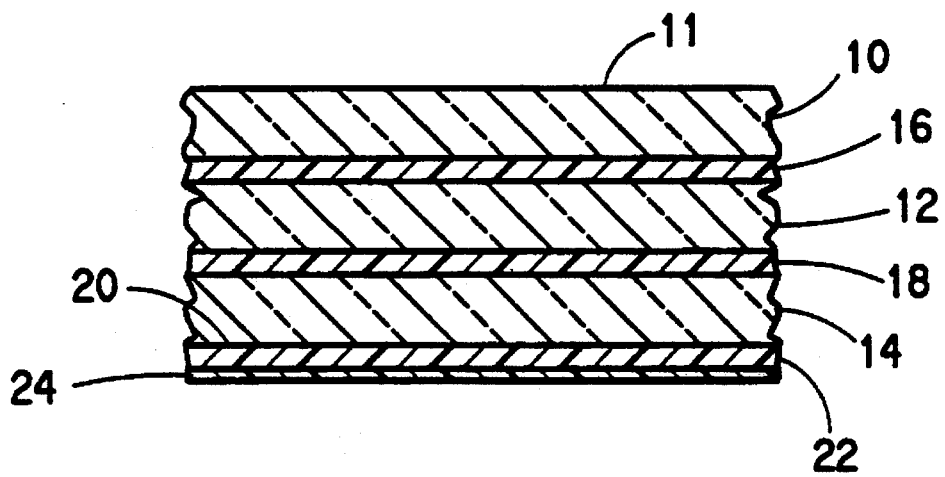
FIGS. 1 and 2 are sections through the edge of a projectile resistant laminate according to the invention.

Referring to FIG. 1, a projectile resistant laminate comprises three sheets 10, 12, and 14 of glass. Glass sheet 10 is positioned in a direction likely to receive an impact from a projectile, e.g. a bullet, on its face 11. Sheets 10, 12, and 14 are bonded together by interlayers of polyvinyl butyral which are from 15 to 60 mils (0.381 to 1.528 mm) thick. A polyethylene terephthalate film 24 from 3 to 15 mils (0.0762 to 0.381 mm) thick is bonded to glass sheet 14 by an interlayer of polyvinyl butyral.

Figure 2:
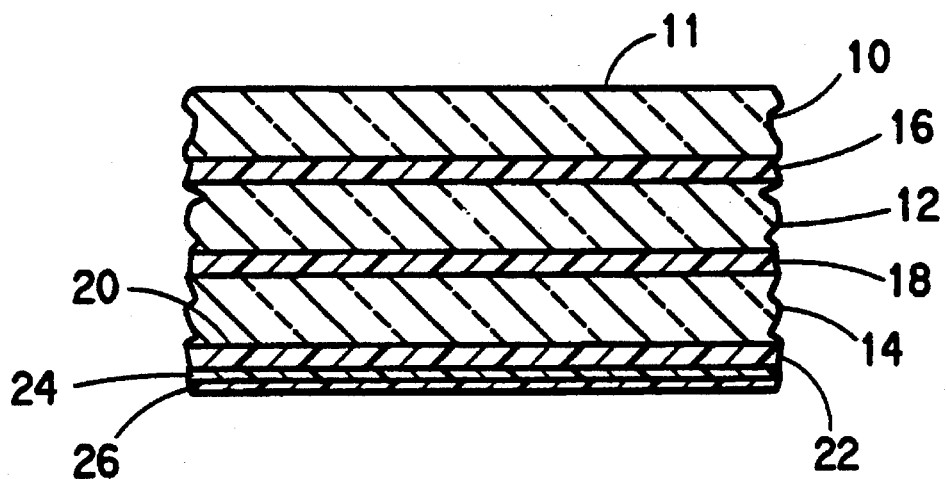

FIG. 2 shows the laminate of FIG. 1 having an abrasion resistant coating 26 adhered to the outer surface of polyethylene terephthalate film 24. Coating 26 may be a silanol coating from 1 to 20 microns thick of the type disclosed in U.S. Pat. No. 4,469,743 and U.S. Pat. No. 4,177,315.

The laminated structure of this invention may be prepared by known laminating methods. Polyvinyl butyral film is interleaved between glass sheets 10, 12 and 14. A composite comprised of polyethylene terephthalate film 24 and polyvinyl butyral film 22 is then positioned over the rear face of glass sheet 14. A coverplate is placed over the assembly, the assembly is edge taped and placed in an airtight bag and subjected to a vacuum. The evacuated assembly is then autoclaved while the bag is maintained under reduced pressure.

The invention will be further illustrated by the following examples.

EXAMPLES

Laminated glass test panels were prepared by sandwiching polyvinyl butyral sheeting having a thickness of 30 mils (0.762 mm) between one foot (304.8 mm)squares of nominal 100 mil (2.54 mm) thick glass. Selected panels included a composite bonded to an outer layer of one of the plies of glass consisting of a layer of a Butacite® polyvinyl butyral sheet having a thickness of 15 mils (0.381 mm) and a polyester film having a thickness of 0.007 inch (0.178 m). A Single shot from a 0.38 caliber handgun was fired at the center of each panel from a distance of 15 feet (4.572 m). Spall was measured as grams of glass ejecting from the backside of the laminate. Spall designated "+++" was not measured but was estimated to be in the range from about 50 to 100 grams, designated "++" in the range from 10 to 15 grams, and "+" less than about 0.2 grams. The results of the tests are set out in the following table.

the samples each with 4 plies of glass, the standard laminate was penetrated, whereas the sample having the same number of plies plus the composite shield is only penetrated 25% of the time. In tests where the composite was not penetrated, no spall was generated. This improvement resulted from the addition of a polyethylene terephthalate and polyvinyl butyral adhesive film of only 22 mils (0.559 mm) thick as compared to a glass laminate thickness of about 0.5 inch (12.7 mm) (an increase of 6.4% in thickness). The same pattern can be seen for the samples each containing 5 plies of glass, where the number of data sets is greater. In this case, the addition of the composite reduces the penetration frequency from 40% to 0% with an increase of only 33% in thickness. It is obvious when comparing 5 plies of Standard Glass Laminate that more protection is afforded when 4 plies of the same thickness of glass is used in the Composite Glass Laminate of the present invention. Even increasing the laminate thickness to 0.6 inch (1524 mm), (5 plies of laminated glass) only reduced the actual penetration to 40% (a 27.7% increase in thickness). To obtain 0% penetration with the standard construction, 6 plies of glass were necessary.

TABLE 1

| | STANDARD GLASS LAMINATE | | | COMPOSITE GLASS LAMINATE | | |
|---|---|---|---|---|---|---|
| NO. OF PLIES | THICKNESS (mm) | PENETRATE | SPALL (gm) | THICKNESS (mm) | PENETRATE | SPALL (gm) |
| 4 | 11.94 | YES | 85.1 | 12.45 | NO | 0.0 |
| 4 | | | | 12.95 | NO | 0.0 |
| 4 | | | | 12.45 | NO | 0.0 |
| 4 | | | | 12.45 | YES | +++ |
| 5 | 15.24 | NO | 10.3 | 15.75 | NO | 0.0 |
| 5 | 15.24 | NO | ++ | 15.49 | NO | 0.0 |
| 5 | 15.24 | YES | +++ | 15.49 | NO | 0.0 |
| 5 | 15 | NO | +++ | 15.75 | NO | 0.0 |
| 5 | 15 | YES | +++ | | | |
| 6 | 18.3 | NO | 13.7 | | | |
| 6 | 18 | NO | ++ | | | |
| 7 | 21.34 | NO | 9.5 | | | |
| 7 | 21.34 | NO | 0.0 | | | |
| 7 | 21.84 | NO | ++ | | | |
| 8 | 24.38 | NO | 0.29 | | | |
| 9 | 27.94 | NO | + | | | |

Results similar to those obtained with 4 plies of glass plus a composite as shown above are obtained using 3 plies of glass plus a composite having a total thickness of about 12.5 mm.

In Table 2 the data from Table 1 is condensed and reformatted to show a percentage of penetration versus sample construction, thickness and the ratio of penetrations to the number of samples tested for each type. Focusing on

TABLE 2

| | STANDARD GLASS LAMINATE | | | | COMPOSITE GLASS LAMINATE | | | |
|---|---|---|---|---|---|---|---|---|
| NO. PLIES | THKNSS (mm) | PENE-TRATE | RATIO | SPALL (gm) | THKNSS (mm) | PENE-TRATE | RATIO | SPALL (gm) |
| 4 | 11.94 | 100% | 1/1 | 85.1 | 12.7 | 25% | 1/4 | 0.0 |
| 5 | 15.24 | 40% | 2/5 | 10.3 | 15.62 | 0% | 0/4 | 0.0 |
| 6 | 18.3 | 0% | 0/2 | 13.7 | | | | |
| 7 | 21.59 | 0% | 0/3 | 9.5 | | | | |
| 8 | 24.38 | 0% | 0/1 | 0.2 | | | | |
| 9 | 27.94 | 0% | 0/1 | + | | | | |
| 11 | 35.56 | 0% | 0/1 | 0.0 | | | | |

I claim:

1. A multilayered glass laminate having enhanced resistance to spalling and penetration by high velocity projectiles consisting of from three to seven plies of glass, each ply having a thickness from 3.175 to 635 mm, with layers of plasticized polyvinyl butyral resin therebetween, said laminate having permanently bonded to an outer layer of one of said plies of glass a thin composite consisting of an adhesive, energy absorbing layer and a dimensionally stable, chemical resistant polyester film, said composite having a thickness not greater than about 2 mm: said polyester film having a thickness of from about 0.762 to 0.381 mm and said adhesive layer having a thickness from about 0.381 to 1.524 mm.

2. The laminate of claim 1 wherein said adhesive layer is plasticized polyvinyl butyral.

3. The laminate of claim 2 wherein said polyester film is coated with an abrasion resistant coating.

* * * * *

UNITED STATES PATENT AND TRADEMARK OFFICE
CERTIFICATE OF CORRECTION

PATENT NO. : 5,567,529
DATED : OCTOBER 22, 1996
INVENTOR(S) : CHARLES A. SMITH

It is certified that error appears in the above-identified patent and that said Letters Patent is hereby corrected as shown below:

In claim 1, line 20, "635 mm" should read --6.35 mm--

Signed and Sealed this

Twenty-fifth Day of February, 1997

Attest:

BRUCE LEHMAN

*Attesting Officer*   *Commissioner of Patents and Trademarks*